C. L. GRIDER.
SHOCK ABSORBER FOR AUTOMOBILES.
APPLICATION FILED JUNE 13, 1917.
1,241,622.
Patented Oct. 2, 1917.
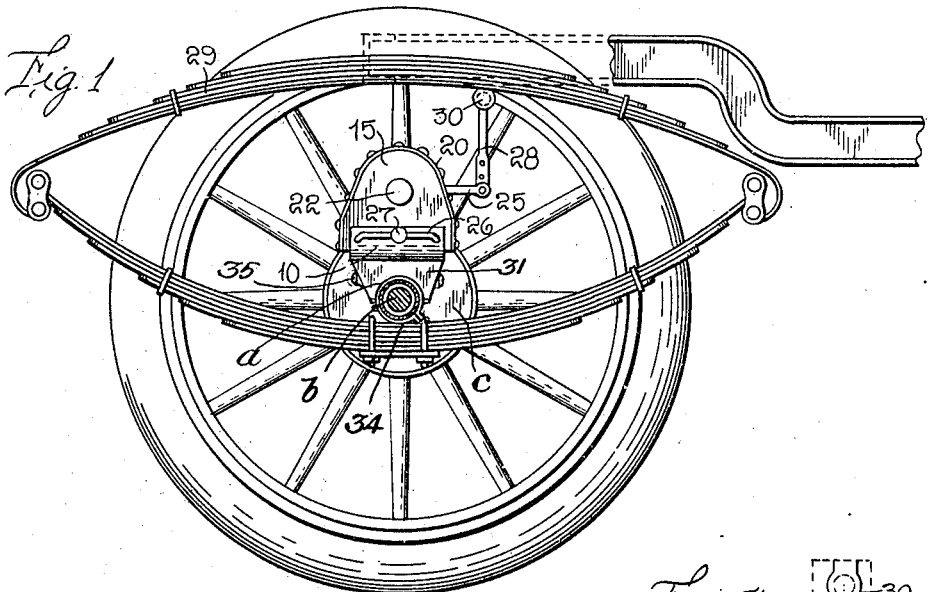
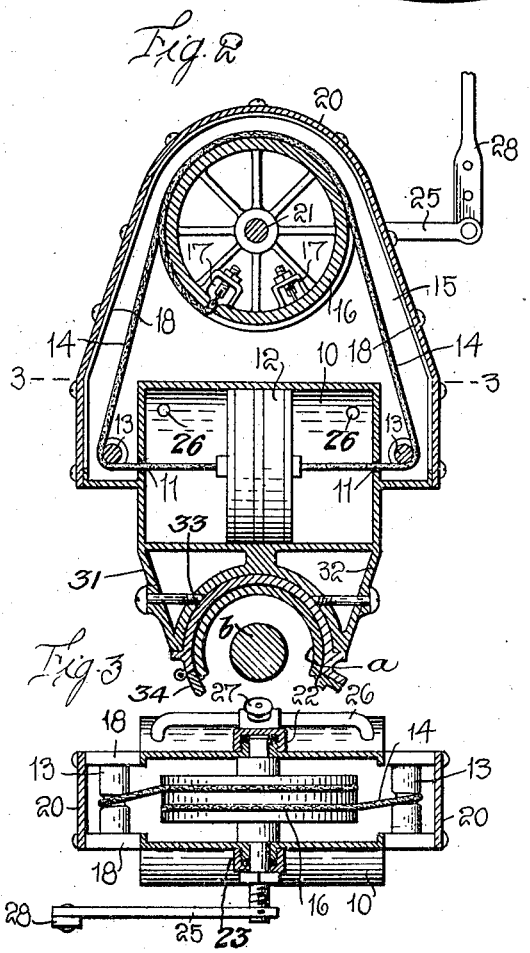
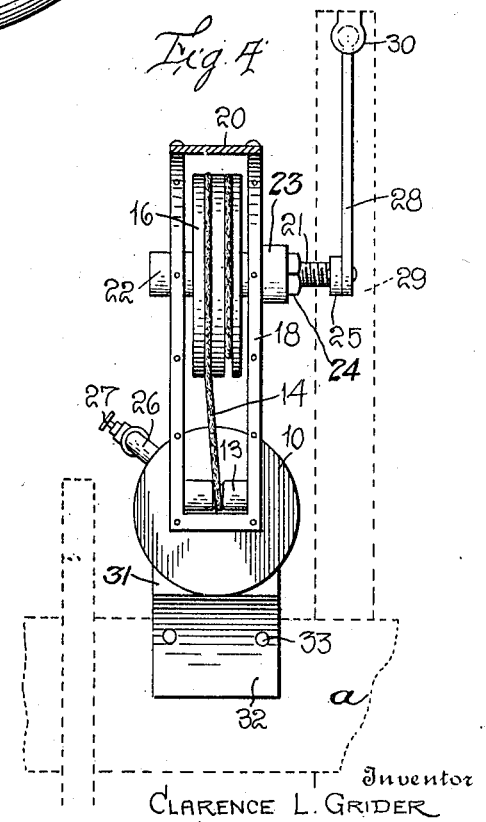
Inventor
CLARENCE L. GRIDER
By Watson E. Coleman
Attorney

UNITED STATES PATENT OFFICE.

CLARENCE L. GRIDER, OF ELY, NEVADA, ASSIGNOR OF ONE-TENTH TO FRANK E. GRIDER, OF ELY, NEVADA.

SHOCK-ABSORBER FOR AUTOMOBILES.

1,241,622.  Specification of Letters Patent.  Patented Oct. 2, 1917.

Application filed June 13, 1917. Serial No. 174,574.

*To all whom it may concern:*

Be it known that I, CLARENCE L. GRIDER, citizen of the United States, residing at Ely, in the county of White Pine and State of Nevada, have invented certain new and useful Improvements in Shock-Absorbers for Automobiles, of which the following is a specification, reference being had to the accompanying drawings.

This invention relates to shock absorbers for automobiles, and the general object of the invention is to provide a shock absorber of a very simple and yet effective character, and in which the undue vibration of the springs of the automobile are resisted by a piston moving through oil or like liquid.

A further object is to provide a device of this character having what may be termed a double dash pot, the piston thereof being attached to a flexible connection, in turn extending around a wheel, which in turn is operatively connected to the springs or body of the automobile, so that any relative movement of the springs and body will be resisted by the movement of the piston in the dash pot.

A further object is to provide means for housing the parts above referred to so that all of the parts may work in oil and thereby be thoroughly lubricated and kept from wear as much as possible.

And a further object is to provide means whereby the stroke of the piston may be adjusted and whereby the resistance offered to the movement of the piston by the oil may be regulated.

Other objects will appear in the course of the following description.

My invention is illustrated in the accompanying drawings, wherein:—

Figure 1 is a side elevation of a portion of an automobile frame with a rear axle, my improved shock absorber being shown in elevation and in applied position.

Fig. 2 is a sectional view of the shock absorber.

Fig. 3 is a top plan view of the construction shown in Fig. 2 with the housing 15 in section; and Fig. 4 is an end view of the structure shown in Fig. 2, with the plate 20 removed.

Referring to these figures, 10 designates a cylinder which constitutes a double dash pot and, which is closed at its ends. The heads of the cylinder are formed with perforations 11 and disposed within the cylinder is a piston 12. Disposed adjacent the openings 11 in the heads of the cylinder are the roller bearings 13, for the flexible cable 14, which is attached to opposite faces of the piston and passes out through the openings 11 and over the rollers 13.

Attached to the cylinder 10 or double dash pot, and extending out in parallel relation thereto are the side plates 15 forming brackets for the support of a wheel 16, which is preferably a spoked wheel. The rim of this wheel is grooved and the ends of the flexible connection 14 pass around the wheel 16 and are attached thereto in any suitable manner, but preferably by passing these ends inward through perforations formed in the rim of the wheel, the inner ends of the cable being operatively connected to tensioning screws 17, in any suitable manner, so that the tension on the cable may be increased or decreased, as required, and the cable kept taut.

Preferably the side plates or brackets 15 carry marginal flanges 18, which extend inward. A covering plate 20 is secured to these flanges 18 by means of cap screws, or in any other suitable manner, so that the rollers 13 and the wheel 16, with the cable 14, are entirely housed and protected. Thus the space inclosed by the side walls 15 and the cover 20 may be filled with oil and thus the wheel 16 may run in oil.

The wheel 16 is mounted upon a shaft 21, which extends out through the side walls or plates 15 and through suitable glands to prevent oil from leaking around the shaft. As illustrated, one end of the shaft is engaged by a cap 22, while the cranked end of the shaft passes through a gland 23 and nut 24. This shaft 21 is formed with a crank arm 25, which is adapted to be operatively connected to the corresponding spring of the motor vehicle, as will be later described. Connecting the upper portion of the cylinder 10 with the lower portion thereof is a bypass pipe 26, which opens into the cylinder 10 at points inward of the heads of the cylinder. This bypass is preferably provided with a valve 27, which will control the ease with which the oil will pass through the bypass. When this valve is turned in one direction, it will impede the passage of oil and in another position, it will permit the freer passage of oil. Thus the resistance formed to the movement of the piston may be readily controlled. I do not wish to limit myself to any particular form of valve for this purpose.

While I do not wish to be limited to any particular manner of connecting the arm 25 to the body of the vehicle or to the springs thereof, I have illustrated the arm 25 as being connected by a link or lever 28 to a spring 29. This link 28 is formed with a plurality of perforations so that the movement of the link or lever may be regulated so as to give the required stroke to the piston. Preferably the lever or link is connected to the top of the spring 29, by means of a ball and socket joint 30.

For the purpose of supporting this shock absorber upon the axle of the vehicle, I attach to the wall of the cylinder 10, on the side opposite from the wheel 16, the hollow bracket 31 having the oppositely disposed inclined walls 32 formed with perforations 33 for the passage of cap screws.

A clamp 34 is provided which engages around the housing $a$ of the axle $b$, as illustrated in Figs. 1 and 2. The screws 35 extend through perforations 33 and engage the clamp. As illustrated in Fig. 1, this shock absorber is disposed on the axle housing $a$ adjacent the brake drum $c$ and inward of this brake drum. Of course, however, I do not wish to be limited to this arrangement of the shock absorber and neither do I wish to be limited to the connecting of the arm 25 to the spring 29, as the arm 25 might be connected to the chassis of the automobile.

It will be seen that in the practical use of this device, if the car wheel drops into a rut or hole in the road, the movement of the spring will actuate the wheel 16 and this will tend to move the piston, but the impediment offered to the movement of the piston by the oil will dampen the rebound before the piston reaches the end of the bypass pipe. If the shock is so great, however, that the piston continues to move past the end of the bypass pipe, then the oil cushion formed at the adjacent end of the cylinder will stop the movement of the piston and cushion it. It will be obvious that the cushioning action of the oil on the piston will take the jar and shock off of the springs, prevent undue movement of the springs and will let the body of the car down very easily. Inasmuch as all the working parts will run in oil, the shock absorbers will not wear to any appreciable extent, thus insuring a long life to the absorbers.

It is obvious, of course, that the device may be modified in many ways without departing from the spirit of the invention.

Having described my invention, what I claim is:—

1. A shock absorber of the character described comprising a cylinder adapted to be filled with liquid, a piston in the cylinder, a rotatable member mounted exterior to the cylinder, a flexible connection attached to the piston extending out at opposite ends of the cylinder and operatively connected to said rotatable member, a bypass between the opposite end portions of the cylinder, and means whereby said rotatable member may be operatively connected to a part of a vehicle.

2. A device of the character described comprising a cylinder having a bypass connecting opposite end portions of the cylinder, a piston operating within the cylinder, rollers mounted upon the ends of the cylinder, a wheel mounted adjacent to the cylinder, a flexible connection attached to the piston, passing out at opposite ends of the cylinder and over said rollers and around said wheel, and an arm projecting from the shaft of the wheel adapted to be operatively connected to a part of the vehicle.

3. A shock absorber comprising a cylinder adapted to contain liquid, a bypass connecting opposite portions of the cylinder, a valve in said bypass controlling the passage of liquid therethrough, rollers mounted upon opposite ends of the cylinder, a wheel operatively supported adjacent to the cylinder, a flexible connection attached to the piston and passing in opposite directions through the ends of the cylinder over said rollers and attached to said wheel to be wound thereon, a housing for the wheel, a shaft upon which the wheel is mounted extending through said housing, an arm on the shaft and an operative connection extending from the arm and adapted to be connected to a part of the vehicle.

4. A shock absorber of the character described comprising a cylinder at its opposite ends, a bypass pipe opening into the cylinder inward of its opposite ends and having a controlling valve, rollers mounted upon opposite ends of the cylinder adjacent said openings, side plates extending outward from the cylinder in spaced relation to each other, a shaft passing through the side plates and having an arm, a grooved wheel mounted upon the shaft to turn therewith, a piston disposed in the cylinder, a flexible connection attached to the piston extending out through said openings and ends of the cylinder over said rollers and partly around the wheel and attached thereto, flanges extending upward from the ends of the cylinder on each side of the rollers, and a cover plate attached to said flanges and to the edges of the side plates and entirely housing the rollers and said wheel and cable, whereby the space inclosed by said cover plate may be filled with oil, an arm attached to the shaft, and a lever connected to the arm and adapted to be connected to a part of the vehicle.

In testimony whereof I hereunto affix my signature in the presence of two witnesses.

CLARENCE L. GRIDER.

Witnesses:
CHRISTIE M. ANDERSON,
A. B. LIGHTFOOT.